United States Patent [19]
Masuda

[11] Patent Number: 5,408,679
[45] Date of Patent: Apr. 18, 1995

[54] MOBILE TELECOMMUNICATIONS SYSTEM HAVING AN EXPANDED OPERATIONAL ZONE

[75] Inventor: Hajime Masuda, Kawasaki, Japan

[73] Assignee: Fujitsu Limited, Kawasaki, Japan

[21] Appl. No.: 914,853

[22] Filed: Jul. 15, 1992

[30] Foreign Application Priority Data

Jul. 18, 1991 [JP] Japan .................. 3-203850

[51] Int. Cl.⁶ ................................ H04B 7/155
[52] U.S. Cl. .................... 455/11.1; 455/16; 455/25; 455/54.1
[58] Field of Search .......... 455/11.1, 13.1, 16, 455/17, 20, 21, 33.1, 33.2, 33.3, 33.4, 56.1, 15, 54.1, 7, 25, 34.1, 234.1; 379/58, 59, 60

[56] References Cited

U.S. PATENT DOCUMENTS

| | | | |
|---|---|---|---|
| 2,421,017 | 5/1947 | Deloraine et al. | 455/17 |
| 4,484,353 | 11/1984 | Flottes et al. | 455/33.1 |
| 4,539,706 | 9/1985 | Mears et al. | 455/11.1 |
| 4,677,687 | 6/1987 | Matsuo | 455/33.2 |
| 4,972,456 | 11/1990 | Kaczmarek et al. | |
| 5,081,671 | 1/1992 | Raith et al. | 455/33.2 |
| 5,129,096 | 7/1992 | Burns | 455/33.1 |
| 5,152,002 | 9/1992 | Leslie et al. | 455/17 |
| 5,231,632 | 7/1993 | Yamao et al. | 455/33.1 |

FOREIGN PATENT DOCUMENTS

406905A2 1/1991 European Pat. Off. .
418103A2 3/1991 European Pat. Off. .

OTHER PUBLICATIONS

Report of the CCIR, 1990.
Microwave Telecommunications by Takashi Matsumoto, 2.1.4 Use of Frequency (Jan. 25, 1966).

*Primary Examiner*—Reinhard J. Eisenzopf
*Assistant Examiner*—Nguyen Vo
*Attorney, Agent, or Firm*—Greer, Burns & Crain, Ltd.

[57] ABSTRACT

A mobile telecommunication system comprises a base station connected to a public communication network and having a non-directional antenna for broadcasting at a first frequency over a first operational zone and for receiving a radio transmission at a second frequency, a relay station provided outside the first operational zone and having a directional antenna directed to the non-directional antenna of the base station for receiving the broadcast therefrom and for transmitting thereto at the second frequency, the relay station further having a non-directional antenna for broadcasting at a third frequency over a second operational zone and for receiving a radio transmission at a fourth frequency, and a mobile terminal movable between the first and second operational zones. The mobile terminal receives the broadcast from either of the base station and the relay station at either of the first and third frequencies and transmit at either of the second and fourth frequencies, wherein the mobile terminal monitors the strength of electric field of the broadcast from the base station and the relay station and selects the station to which the mobile terminal communicates in response to the strength of the electric field.

7 Claims, 11 Drawing Sheets

MOBILE TELECOMMUNICATIONS SYSTEM HAVING AN EXPANDED OPERATIONAL ZONE

BACKGROUND OF THE INVENTION

The present invention generally relates to telecommunication systems and more particularly to a mobile telecommunication system having an expanded operational zone.

In the mobile telecommunication systems for communication with a mobile terminal such as a land mobile radiotelephone, a system called cellular system is used widely. In the cellular system, the service area is divided into a plurality of cells or operational zones formed adjacent with each other, and a base station is provided in each operational zone. The base stations are connected to the public communication network via a common center station and establishes a connection between the public communication network and a mobile terminal via a radio frequency channels. There, the radio frequency used for the communication to the mobile terminal is changed in each zone for avoiding interference, and the center station controls the base stations based upon the information about the mobile terminals operating in the zones. When a connection is to be set up with respect to a particular mobile terminal, the center station controls the base station of the zone in which the mobile terminal is operating to establish a connection therewith. This cellular system is suitable particularly for large cities where there are a large number of subscribers. On the other hand, the cellular system requires a complex control of the base stations such as the registration of the mobile terminals in each zone, switching of the frequency based upon the information about the registered mobile terminals, and the like at the base station. Thereby, the construction of the base station is inevitably complex and expensive.

In the small cities or rural areas where the number of subscribers is small, on the other hand, a more simple, low cost system is desired. In such a low cost system, a single base station is provided to cover a wide service area typically having a diameter of several ten kilometers. Thereby, the facility for controlling the System is simplified significantly.

In such a simplified system, there frequently occurs a demand to expand the service area of the system for example along a major highway. In order to meet such a demand, it is proposed to provide one or more repeater or,relay stations for relaying the communication. Conventionally, such relay stations are connected to the base station via a multiplexed radio channel and operates similarly to the base station except that the relay stations are connected to the public network via the exchange unit of the base station. More specifically, the relay station includes a complex line control unit similar to that of the base station for connection with the public network, in addition to the transmitters and receivers for communication with the mobile terminal. Further, both the base station and relay station are required to have a multiplex microwave radio unit for maintaining the communication therebetween.

FIG. 1 shows the constitution of the aforementioned conventional mobile telecommunication system for rural use.

Referring to FIG. 1, the system generally comprises a base station BS connected to a public communication network 100, a relay station RS connected to the base station via a multiplex microwave radio link MWLINK, and a mobile terminal not illustrated. The base station BS includes an exchange unit 101 connected to the public communication network 100. Thereby, the exchange unit 101 allocates a terminal identification number to each mobile terminal in the service area of the system and establishes an automatic connection between the mobile terminal and the public communication network 100 based upon the terminal identification number.

The base station BS further includes a line control unit 102 connected to the exchange unit for controlling the communication with the base station BS and the mobile terminal that is operating in the operational zone of the base station. More specifically, the line control unit 102 carries out various control functions such as: allocation of frequency to the control channel of the system; calling of the designated mobile terminal via the control channel and allocation of frequency to the talk channel; accepting of a call request from the mobile terminals in the zone via the control channel and allocation of frequency to the talk channel; registration of the terminal location based upon the notification from the mobile terminal via the control channel; switching of the zone while maintaining the connection via the talk channel; connection of the signals in the talk channel, etc.

The line control unit 102 is connected to a number of transmitters 103 and receivers 104 for the talk channels as well as to a transmitter 105 and a receiver 106 for the control channel, and these transmitters and receivers are connected commonly to a non-directional antenna 107 via an antenna duplex and branching unit 108. It should be noted that each transmitter or receiver operates at a frequency pertinent thereto, and these transmitters and receivers are provided in number corresponding to the number of the radio channels of the base station BS.

Further, there is provided a multiplexer/demultiplexer unit 109 in connection with the line control unit 102 for multiplexing and/or demultiplexing the communications to be exchanged between the public network 100 and those terminals outside the zone of the base station BS via a microwave radio link. There, the microwave connection is achieved by a microwave transmitter/receiver unit 110 of the base station BS and a corresponding microwave transmitter/receiver unit 111 of the relay station RS. It should be noted that the communication achieved by 10 the microwave connection includes, in addition to the usual talk channels and the corresponding control channel, a zone Switching control signal for switching the zone between the base station and the relay station. This zone switching control signal is used when a mobile terminal moves from the zone of the base station BS to the zone of the relay station RS, or vice versa.

In the relay station RS, a multiplexer/demultiplexer unit 112 corresponding to the unit 109 of the base station BS is provided, and a line control unit 113 is connected to the unit 112 similarly to the base station. There, the line control unit 113 has a construction and function substantially identical with the line control unit 102 of the base station and controls a number of transmitters and receivers 114 and 115 corresponding to the talk channel as well as a transmitter 116 and a receiver 117 for the control channel. These transmitters and receivers are connected commonly to a non-directional antenna 118 via an antenna sharing unit 119 corresponding to the unit 108 of the base station BS, and achieves a communication with the mobile terminals operating in the operational zone of the relay station RS.

As will be understood easily, the system as shown in FIG. 1 requires complex facilities for the relay terminal RS such as the line control unit 113 that are substantially identical with the corresponding facilities of the base station, in addition to the multiplexer/demultiplexer and multichannel radio units. Thus, the expansion of the service area of the system by adding the relay station shown in FIG. 1 inevitably increases the cost of the system.

Meanwhile, it is known to expand the service area of a radiotelephone beyond the base station as described in the REPORTS OF THE CCIR 1990, ANNEX TO VOLUME IX-PART 1, pp. 345, CCIR, Geneva 1990.

Referring to FIG. 2 showing the construction disclosed in the above mentioned reference somewhat schematically, there is provided a base station BS in connection with a public communication network. The base station has an operational zone #0, and establishes a connection with a stationary, non-mobile terminal $S_0$ operating in the zone #0. More specifically, the base station BS has a non-directional main antenna and broadcasts in the zone #0 with a frequency $f_A$, and the broadcast is received by the stationary terminal $S_0$. The stationary terminal $S_0$ has a high-gain directional antenna and transmits a radio signal back to the base station BS at a second frequency $f_B$.

The broadcast of the base station BS at the frequency $f_A$ is received also by a relay station $RS_1$ that has a directional antenna directing toward the main antenna of the base station BS. Further, the relay station $RS_1$ transmits back a radio signal to the base station BS via the same directional antenna at a frequency set equal to the frequency $f_B$ and establishes thereby a connection with the base station BS. In addition, the relay station $RS_1$ has a non-directional main antenna and broadcasts at a frequency set equal to the frequency $f_B$ such that the relay station $RS_1$ covers an operational zone #1. In the zone #1, there is provided a stationary, non-mobile terminal $S_1$ that has a directional antenna directing toward the main antenna of the relay station $RS_1$, and the terminal $S_1$ transmits a radio signal to the relay station $RS_1$ at a frequency set equal to the frequency $f_A$.

Similarly, there is provided another relay station $RS_2$ wherein the relay station receives the broadcast of the station $RS_1$ at the frequency $f_B$ and rebroadcasts the same at a frequency set equal to $f_A$ to cover an operational zone #3. Thereby, a transmission from a stationary, non-mobile terminal in the zone #2 is transmitted back to the relay station $RS_2$ at the frequency $f_B$ and sent back to the relay station $RS_1$ at the frequency $f_A$.

In the radiotelephone system of this prior art, the expansion of the service area of the system is achieved easily by constructing additional relay stations such as a relay station $RS_3$. As the relay station of this Conventional system is required to have only a pair of receivers for receiving the radio signals at the frequencies of $f_A$ and $f_B$ and a pair of transmitters for transmitting the radio signals at the frequencies of $f_A$ and $f_B$ for each channel, the relay station can be constructed very simply. Further, the conventional system of FIG. 2 is advantageous from the view point of the saving of the radio frequency, as the system uses only two frequencies, $f_A$ and $f_B$, for one channel.

When the system of FIG. 2 is applied to the mobile telecommunication systems wherein the mobile terminal moves around in the zone as well as across the boundary of the zones, there arises a problem in that the transmission from the mobile terminal such as the terminal $S_1$ in the zone #1 at the frequency $f_A$ may be intercepted by the directional antenna used at the station $RS_1$ for receiving the broadcast from the base station BS also at the frequency $f_A$. When this occurs, the transmission from the terminal $S_1$ is broadcasted again from the main antenna of the relay station $RS_1$, and the system no longer operates properly.

SUMMARY OF THE INVENTION

Accordingly, it is a general object of the present invention to provide a novel and useful mobile telecommunication system wherein the foregoing problems are eliminated.

Another and more specific object of the present invention is to provide a mobile telecommunication system having a service area that can be expanded easily and with low cost.

Another object of the present invention is to provide a mobile telecommunication system for connecting a public communication network to a mobile terminal via a radio communication channel, comprising: a base station connected to a public communication network for receiving an information signal therefrom and having a non-directional antenna for broadcasting said information signal at a first frequency over a first operational zone, said first operational zone being characterized by an electric field strength of said broadcast from said base station that exceeds a predetermined level. The base station further receives a radio transmission at a second, different frequency by said non-directional antenna and transfers an information signal contained therein to said public telecommunication network; a relay station provided outside said first operational zone and having a directional antenna directed to said non-directional antenna of said base station for receiving a broadcast therefrom. The relay station further has a non-directional antenna for broadcasting said information signal contained in said broadcast from said base station, at a third frequency which is different from any of said first and second frequencies over a second operational zone, said second operational zone being characterized by an electric field strength of said broadcast from said relay station that exceeds a predetermined level. The relay station further receives a radio transmission at a fourth frequency different from any of said first through third frequencies by said non-directional antenna provided thereto and transmits an information signal contained therein to said non-directional antenna of said base station. A mobile terminal movable between said first and second operational zones and operating in either of said first and second operational zones receives said broadcast from either of said base station and said relay station at either of said first and third frequencies, and transmits an information signal at either of said second and fourth frequencies, said mobile terminal monitoring the strength of said electric field of said broadcast from said base station and said relay station for selecting a reception at said first frequency and a transmission at a second frequency when said strength of the electric field of the broadcast from the base station exceeds a predetermined threshold. The mobile terminal further selects a reception at said third frequency and a transmission at a fourth frequency when said strength of the electric field the base station does not exceed the threshold and said strength of the electric field of the broadcast from the relay station exceeds said predetermined threshold.

According to the present invention, one can simplify the construction of the relay station significantly. It should be noted that the relay station is required to have only two transmitters respectively for transmitting at the second and third frequencies and only two receivers respectively for receiving at the first and fourth frequencies. The line control unit or multiplex/demultiplex unit and the multichannel microwave radio as used in the conventional system of FIG. 1 is no longer necessary for the relay station. Thereby, one can expand the service area of the mobile telecommunication system easily, without huge expense. Of course, the service area can be extended beyond the area covered by a single base station and a single relay station, by adding one or more relay stations.

Other objects and further features of the present invention will become apparent from the following detailed description when read in conjunction with the attached drawings.

DETAILED DESCRIPTION OF THE PREFERRED EMBODIMENTS

Figure 3:
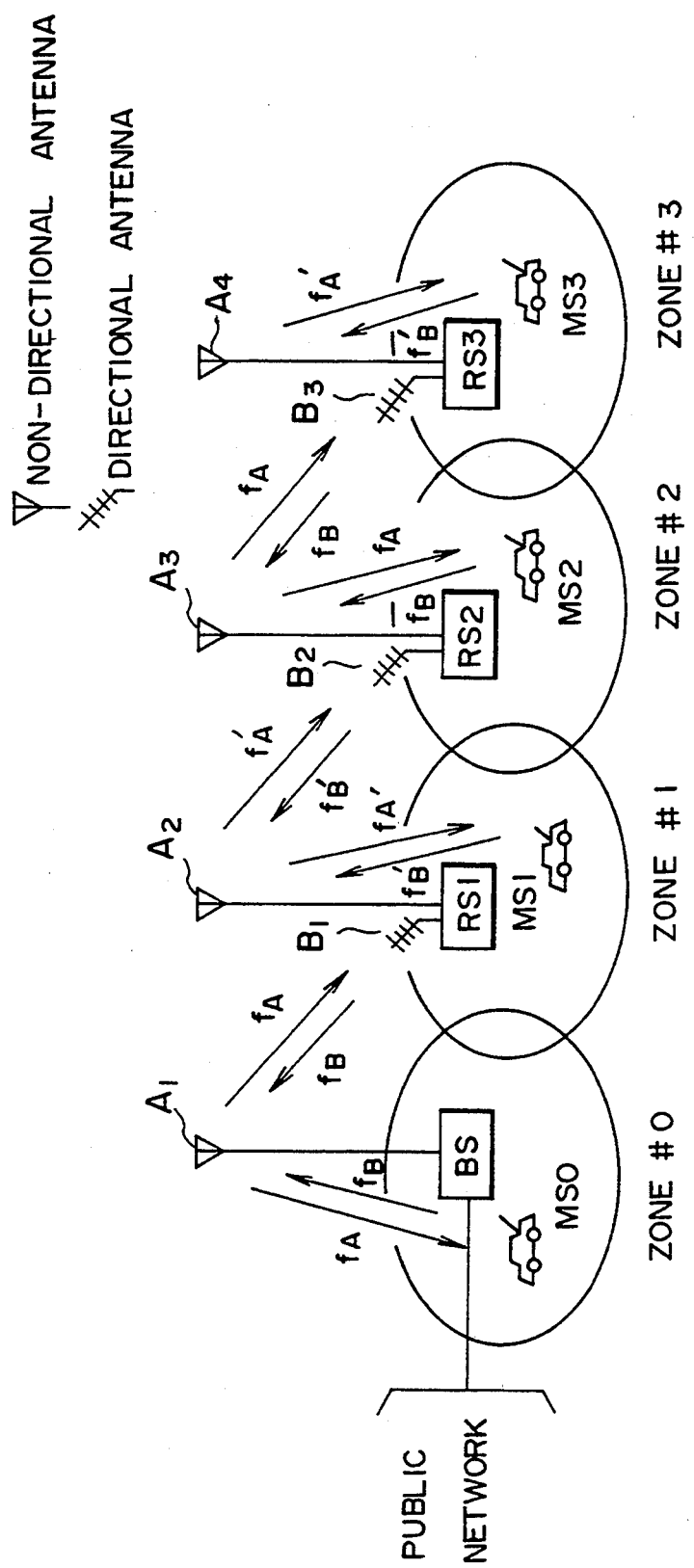
FIG. 3 is a block diagram showing the concept of the mobile telecommunication system according to an embodiment of the present invention.

FIG. 3 shows the concept of the mobile telecommunication system of the present invention.

Referring to FIG. 3, the system includes a base station BS connected to a public communication network, a number of relay stations $RS_1$–$RS_3$, and a number of mobile stations $MS_0$–$MS_3$.

There, the base station BS receives a call from the public network and broadcasts the same in the form of a radio wave from a non-directional antenna $A_1$ at a first frequency $f_A$. There, the broadcast covers an operational zone #0 with an electric field strength such that a mobile terminal $MS_0$ operating in the zone #0 can receive and detect the content of the broadcast. Further, the mobile terminal in the zone #0 transmits a signal such as a call in the form of a radio wave to the non-directional antenna $A_1$ of the base with a second frequency $f_B$ that is different from the first frequency $f_A$. Thus, any mobile terminal operating in the zone #0 can establish a connection with the public communication network via the base station BS as usual in the mobile telecommunication system.

In order to expand the service area beyond the operational zone #0 of the base, the present invention provides a relay station $RS_1$ adjacent to but outside the zone #0 such that the relay station $RS_1$ covers a second operational zone #1 by a non-directional antenna $A_2$. More specifically, the relay station $RS_1$ has a high-gain directional antenna $B_1$ directing toward the non-directional antenna $A_1$ of the base BS for receiving the broadcast therefrom at the frequency $f_A$. The signal thus received by the antenna $B_1$ is then rebroadcasted by the non-directional antenna $A_2$ at a third frequency $f_A'$ that is set different from any of the frequencies $f_A$ and $f_B$. The broadcast of the relay station $RS_2$ covers the foregoing third operational zone #2 with the electric field strength such that a mobile terminal $MS_2$ operating in the zone #2 can receive and detect the content of the broadcast. Further, the mobile terminal $MS_1$ transmits a signal such as a call in the form of a radio wave to the antenna $A_2$ at a fourth frequency $f_B'$ that is set different from any of the frequencies $f_A$, $f_B$ and $f_A'$.

According to the system of FIG. 3, a call or message sent from the public communication network to a mobile terminal operating somewhere in the zone #1 or zone #2 is broadcasted simultaneously in the both zones. Upon reception of the call by the mobile terminal, a connection is established between the mobile terminal and the public communication network. Similarly, the mobile terminal operating in any of the first and second zones can setup a connection by transmitting a radio wave signal to the non-directional antenna that covers the zone. Thus, the service area of the system is expanded successfully from the original zone #0 of the base BS to the zones #1 and #2 by adding the relay stations $RS_1$ and $RS_2$. The mobile terminal such as the terminal $MS_0$ or $MS_1$ monitors the electric field strength of the broadcast and switches the frequency to the station that provides the electric field strength exceeding a predetermined threshold. For example, the terminal $MS_0$ switches the transmission frequency and the reception frequency from $f_A$ and $f_B$ to $f_A'$ and $f_B'$ or vice versa, upon crossing the border between the zone #0 and the zone #1.

As the relay station merely receives a transmission signal and retransmits the same signal at a different frequency, one can significantly simplify the construction of the relay station $RS_1$. Thus, one can expand the service area of the system easily and with little cost, by adding other relay stations $RS_2$, $RS_3$, etc. as indicated in FIG. 3.

Referring to FIG. 3 again, the relay station $RS_2$ is provided outside the operational zones #0 and #1 but adjacent to the zone #1, and has a construction substantially identical with the relay station $RS_1$. Thus, the relay station $RS_2$ has a non-directional antenna $A_3$ having an operational zone #2 and a directional antenna $B_2$ directing to the antenna $A_2$ of the station $RS_1$. There, the antenna $B_2$ receives the broadcast from the antenna $A_2$ at the frequency $f_A'$, and the relay station $RS_2$ rebroadcasts the received transmission from the antenna $A_3$ with a frequency set equal to the frequency $f_A$. There, a mobile terminal $MS_2$ operating in the zone #2 receives the broadcast at the frequency $f_A$ from the antenna $A_3$ and transmits back a radio wave signal to the antenna $A_3$ at a frequency set equal to the frequency $f_B$. Similarly, there is provided another relay station outside the zones #0 through #2 but adjacent to the zone #2 for receiving the broadcast from the antenna $A_3$ of the station $RS_2$ and for rebroadcasting the received transmission over an operational zone #3 from a non-directional antenna $A_4$ with a frequency set equal to $f_A'$. There, the relay station $RS_3$ has a directional antenna $B_3$ directing to the antenna $A_3$ for receiving the broadcast at the frequency $f_A$ and for transmitting back to the antenna $A_3$ at the frequency $f_B$. Further, a mobile terminal $MS_3$ operating in the zone #3 receives the broadcast at the frequency $f_A'$ and transmits back at a frequency set equal to the frequency $f_B'$.

In the system of FIG. 3, it will be noted that one can increase or expand the service area of the system by merely adding the relay stations consecutively for example along a major highway. As already noted, Such relay stations merely achieve a reception and transmission and can be constructed with a low cost. It should be noted further that the system of FIG. 3 uses only four frequencies, $f_A$, $f_A'$, $f_B$ and $f_B'$, for one talk channel or for one control channel, even when the number of the relay stations is increased. Thereby, one can save the frequency that is occupied by the channels and an efficient use of the frequency is achieved. The problem of the interference occurring between the stations that use the same frequency is successfully avoided by using the directional antenna for connecting a relay station to the base station or to the relay station that is closer to the base station. For example, the transmission from the antenna $B_1$ of the relay station $RS_1$ to the antenna $A_1$ of the base station BS at the frequency $f_B$ does not cause interference on the communication between the antenna $A_3$ of the relay station $RS_2$ and the mobile unit $MS_2$ in the zone #2 because of the directivity of the antenna $B_1$. Further, the interference between the stations such as the base station BS and the relay station $RS_3$ does not occur, as these stations are separated from each other by a sufficient distance.

Figure 4:
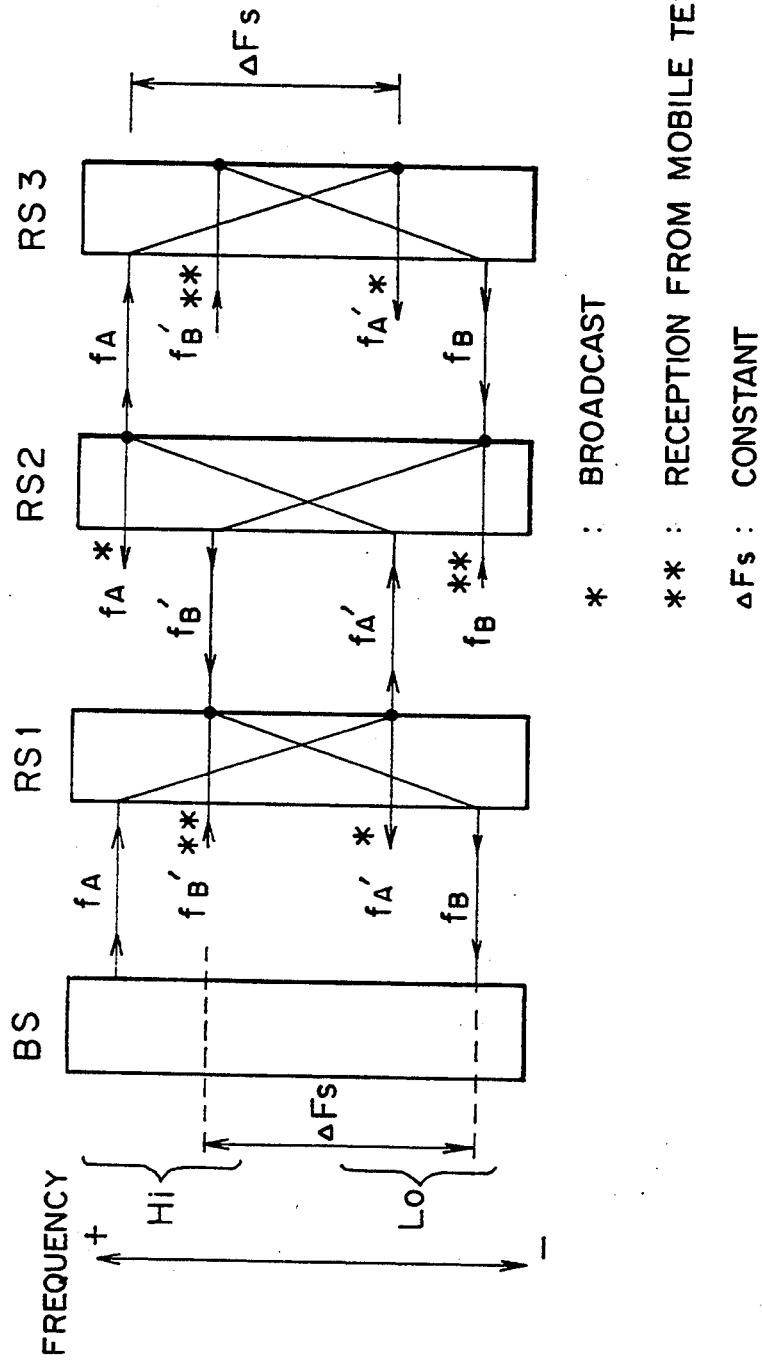
FIG. 4 is a diagram showing the allocation of frequencies in the telecommunication system of FIG. 3.

FIG. 4 shows the relationship between the four frequencies used for one channel in the system of FIG. 3.

Referring to FIG. 4, it will be noted that the frequency $f_A$ and the frequency $f_A'$ are separated from each other by a frequency $\Delta F_s$, while the frequency $f_B$ and the frequency $f_B'$ are separated from each other also by the same frequency $\Delta F_s$. Thereby, the channel uses only four frequencies even when the number of the relay stations is increased. The relationship of FIG. 4 holds true in the talk channel used for the communication of voice signals as well as in the control channel used for the control of the system operation.

Figure 5:
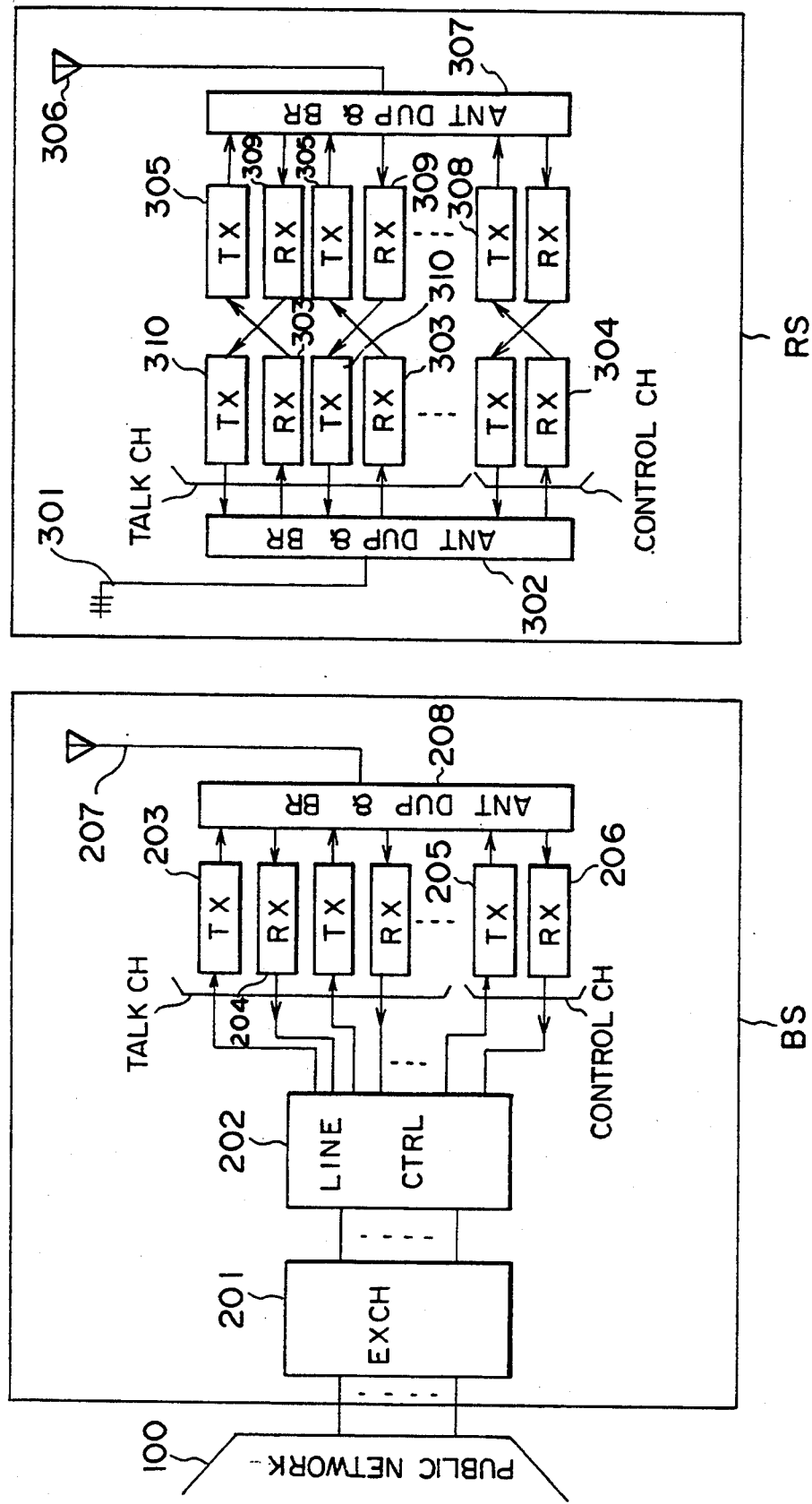
FIG. 5 is a block diagram showing the construction of a base station and a relay station used in the system of FIG. 4.

FIG. 5 shows the block diagram of the base station BS and a relay station RS which may be any of the relay stations $RS_1$–$RS_3$.

Referring to FIG. 5, the base station BS includes an exchange unit 201 connected to the public communication network 100 and a line control unit 202 connected to the exchange unit 201. The exchange unit 201 corresponds to the exchange unit 101 of FIG. 1 and is configured similarly thereto. Further, the line control unit 202 corresponds to the line control unit 102 of FIG. 1 and is configured similarly thereto. Thus, the description of the units 201 and 202 will be omitted.

Figure 1:
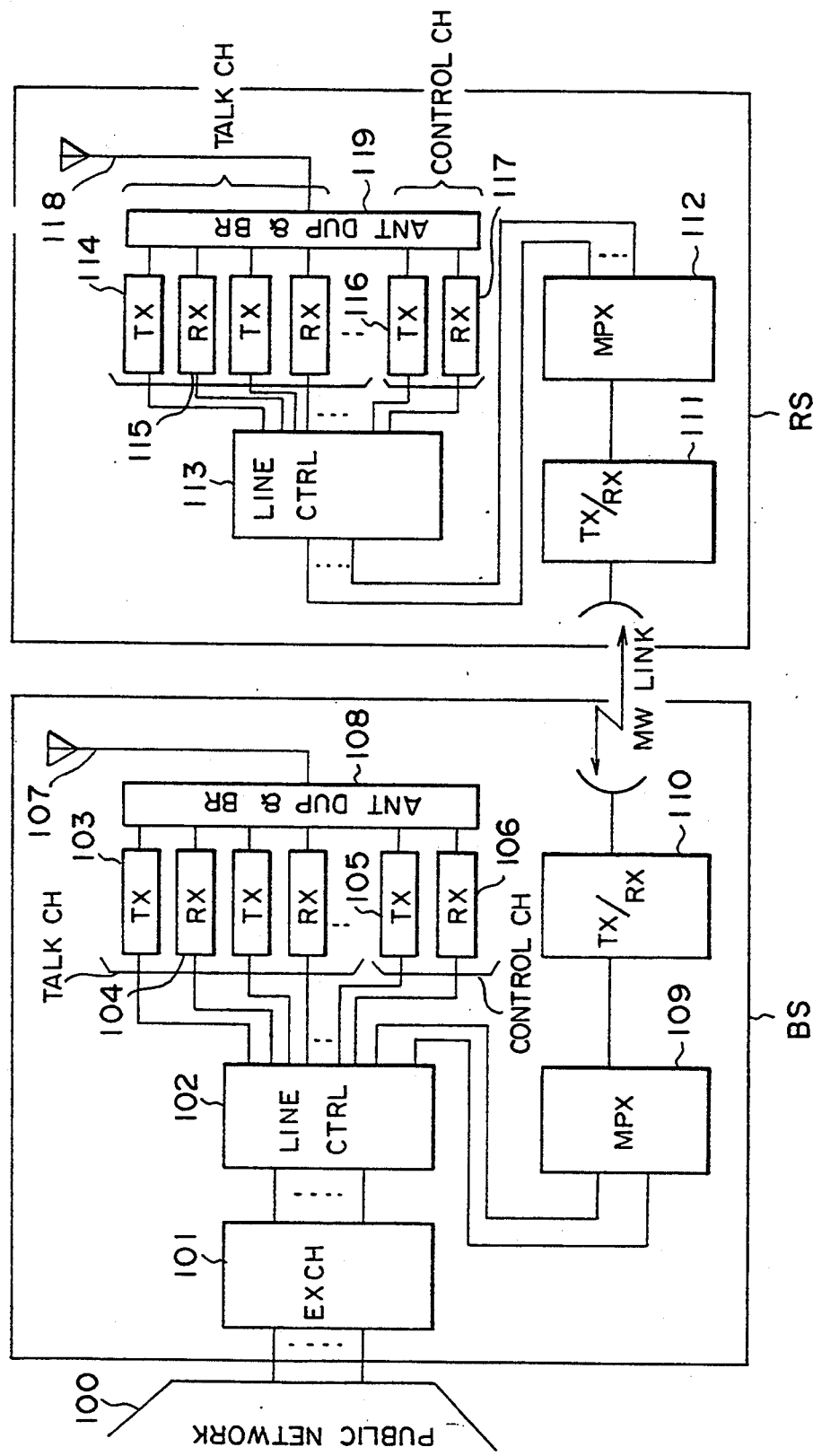
FIG. 1 is a block diagram showing the construction of a conventional mobile telecommunication system that expands the service area by a relay station.
Figure 2:
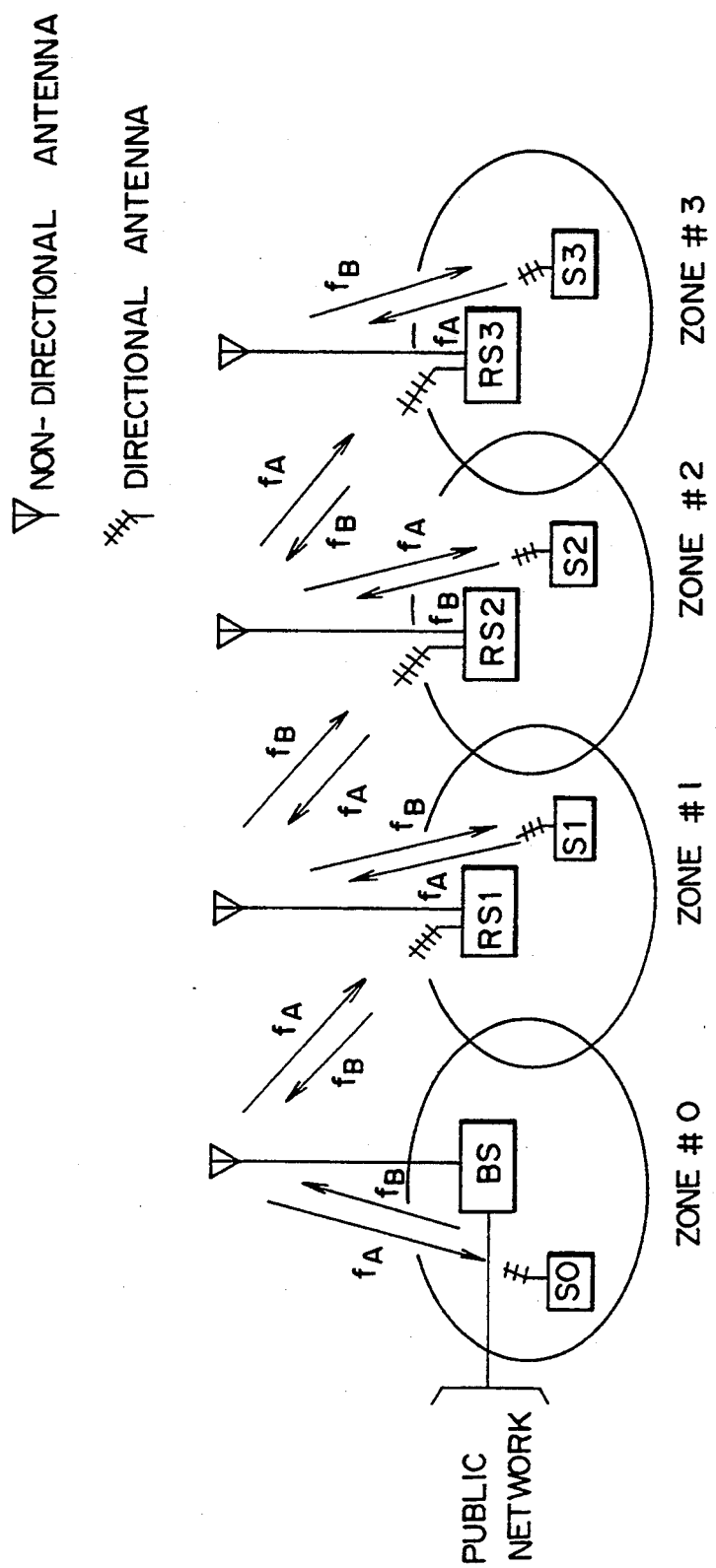
FIG. 2 is a block diagram showing the construction of a conventional telecommunication system for use with stationary terminals for expanding the service area by relay stations.

In FIG. 5, it will be noted that the line control unit 202 is connected to a number of transmitters 203 and receivers 204 for the talk channel as well as to a transmitter 205 and a receiver 206 for the control channel, while there is no multiplex unit corresponding to the unit 109 of FIG. 1 or corresponding transmitter/receiver unit. The transmitters 203 or 205 and the receivers 204 and 206 are merely connected to a non-directional antenna 207 corresponding to the antenna $A_1$ of FIG. 3 via an antenna duplex and branching unit 208 that corresponds to the unit 108. It will be noted that the construction of the base station BS used in the system of FIG. 3 is significantly simplified over the conventional base station shown in FIG. 1. The transmitters 203 and the receivers 204 are provided in number that corresponds to the number of talk channels and transmit or receive radio wave signals at respective frequencies which are schematically designated in FIG. 3 as $f_A$ and $f_B$.

Next, the construction of the relay station RS will be described in detail again with reference to FIG. 5.

Referring to FIG. 5, the relay station RS has a directional a antenna 301 corresponding to the directional antenna $B_1$–$B_3$ of FIG. 3. The antenna 301 is connected to a first antenna sharing unit 302 that in turn is connected to a number of receivers 303. There, the radio wave transmission of the talk channel received at the antenna 301 is transferred to the receivers 303, and the receivers 303 produce respective baseband output signals in response thereto. The antenna sharing unit 302 is connected further to a receiver 304 off, the control channel and supplies thereto the radio wave transmission for the control channel. Thereby, the receiver 304 produces a corresponding baseband output. When the relay station is the station $RS_1$, the antenna 301 receives the broadcast at the frequency $f_A$. See FIG. 3.

The receivers 303 are provided in number corresponding to the number of the talk channels and connected to corresponding transmitters 305 for supplying thereto the baseband signals. There, the transmitters 305 produce radio wave signals with respective frequencies, and the radio wave signals thus produced are sent to a non-directional antenna 306 via a second antenna sharing unit 307. The non-directional antenna 306 of course corresponds to the non-directional antenna $A_2$–$A_4$ of FIG. 3 and broadcasts the radio wave signals over an operational zone such as the zone #1 of FIG. 3. Similarly, the receiver 304 is connected to a transmitter 308 and the transmitter 308 produces a corresponding radio wave signal. The radio wave signal thus produced is then supplied to the antenna 306 via the antenna sharing unit 307 and broadcasted therefrom with the frequency $f_A'$ when the relay station is the station $RS_1$ of FIG. 3.

Further, there is provided a number of receivers 309 connected to the antenna 306 via the antenna sharing Unit 307 for receiving the radio wave signals received by the antenna 306. In the case where the relay station in consideration is the station $RS_1$, the antenna receives the transmission from the mobile terminal $MS_1$ as well as from the directional antenna of the relay station $RS_2$ at the frequency $f_B'$. Each receiver 309 thereby produces a baseband signal in response to the received radio wave signal and supplies the same to a corresponding transmitter 310 that is connected thereto. Further, the transmitter 310 produces a radio wave signal at the frequency $f_B$. The radio wave signal thus produced is then supplied to the directional antenna 301 via the antenna sharing unit 302 and transmitted therefrom to the antenna 207 of the base BS. Further, the similar explanation holds also true for other relay stations. As the construction of the relay station other than the relay station RS₁ is obvious from the above explanation, further description will be omitted.

Figure 6:
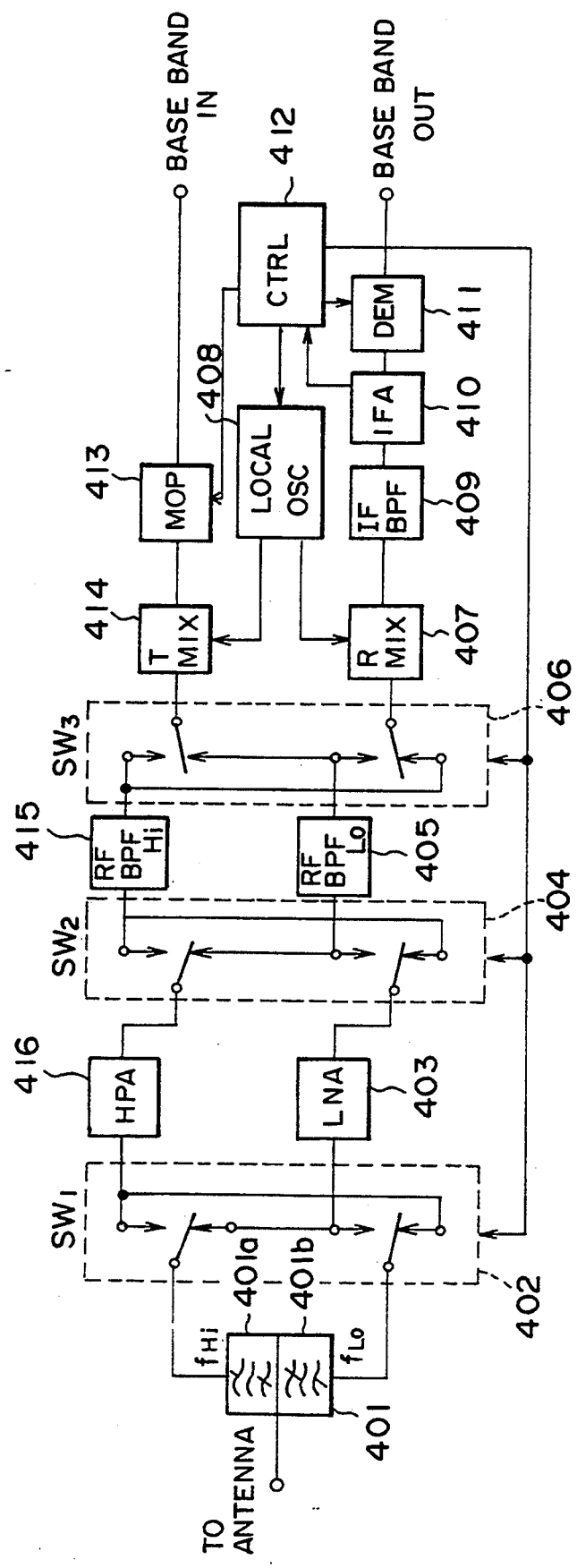
FIG. 6 is a block diagram showing the construction of a mobile terminal used in the system of FIG. 4.

FIG. 6 shows the construction of the mobile terminal used in the system of the present invention. As usual, the mobile terminal includes both a transmission system and a receiver system and acts as a transceiver.

Referring to FIG. 6, the mobile terminal includes an antenna sharing unit 401 connected to an antenna not illustrated, wherein the unit 401 comprises a first band-pass filter 401a having a center of pass band, $f_{Hi}$, set generally coincident to the center of the upper frequency band used for the communication and a second band pass filter 401b having a center of pass band frequency, $f_{Lo}$, which is set generally coincident to the center of the lower frequency band. As can be seen in FIG. 3, the mobile terminal receives the incoming radio signal having the frequency $f_A$ or $f_A'$ wherein the frequency $f_A$ is included in the upper band while the frequency $f_A'$ is included in the lower band. See FIG. 4. Similarly, the frequency $f_B$ is included in the lower band while the frequency $f_B'$ is included in the upper band.

In the first setting for receiving the radio wave signal at the frequency $f_A$ and transmitting at the frequency $f_B$, the received radio signal is supplied from the filter 401a to a usual low noise RF amplifier 403 for amplification via a switch circuit 402. The RF amplifier 403 thereby produces an output RF signal and supplies the same to a band-pass filter 415 via a second switch circuit 404. Thereby, the band-pass filter 415 passes therethrough the RF signal of the upper band selectively and supplies the RF signal further to a mixer 407 via another switch circuit 406.

The mixer 407 is supplied with a local oscillation signal from a local oscillator 408 and produces an IF signal 407 as a result of the mixing of the incoming RF signal and the local oscillation signal. The IF signal thus produced is then supplied to an IF amplifier 410 via an IF band-pass filter 409 for amplification and is demodulated in a demodulation unit 411. Thereby, the demodulation unit 411 demodulates the incoming IF signal and produces a baseband output signal in response thereto.

In the mobile terminal of FIG. 6, the IF amplifier 410 produces further a level detection signal indicating the level or strength of the electric field of the incoming radio signal to which the receiver system is tuned and supplies the same to a controller 412. The controller 412 thereby controls the local oscillator 408 and changes the frequency of the local oscillation signal in response to the strength of the electric field. The operation of the controller 412 will be described in more detail later.

In the transmitter system, a baseband signal is supplied from an audio system not illustrated to a modulator 413 for modulation and an IF signal thus produced as a result of the modulation is supplied to a transmission mixer 414 for mixing with a local oscillation signal of the local oscillator 408. Thereby, the mixer produces sideband RF signals as a result of the mixing in correspondence to the frequency difference of the IF frequency from the frequency of the local oscillator. When the receiver system is tuned to the frequency $f_A$, it should be noted that the transmitter system is tuned to the frequency $f_B$. The RF signal thus produced by the mixer 414 with the frequency $f_B$ is supplied to an RF power amplifier 416 after passing consecutively through the switch circuit 416 that directs the RF signal to pass through a bandpass filter 405 to select a desired sideband signal. After amplification in the power amplifier 416, the RF signal at the frequency $f_A$ is supplied to the filter 401b of the antenna sharing unit 401 via the switch circuit 402 and further to the antenna from the unit 401. There, the band-pass filter 405 has the passband frequency $f_{Lo}$ set coincident to the lower frequency band as already noted.

In the mobile terminal of FIG. 6, the transmission frequency and the reception frequency is changed as already described with reference to FIGS. 3 and 4. In order to effect the change of the frequency, the mobile terminal uses the controller 412 that controls the oscillation frequency of the local oscillator 408. Simultaneously to the change of the oscillation frequency of the local oscillator, the controller 412 controls the switch circuits 402, 404 and 406 to switch the path of the RF signals such that the RF signal produced in the mixer 414 with the frequency $f_B'$ is supplied to the antenna after passing consecutively through the switch 406, the band pass filter 415, the switch 404, the power amplifier 416, the switch 402 and the filter 401a and such that the RF signal received at the antenna with the frequency $f_A'$ is supplied to the mixer 407 after passing consecutively through the filter 401b, the switch circuit 402, the RF amplifier 403, the switch 404, the band pass filter 405 and the switch 406.

Next, the construction used for switching the frequency in the mobile terminal will be described in more detail with reference to FIG. 7.

Figure 7:
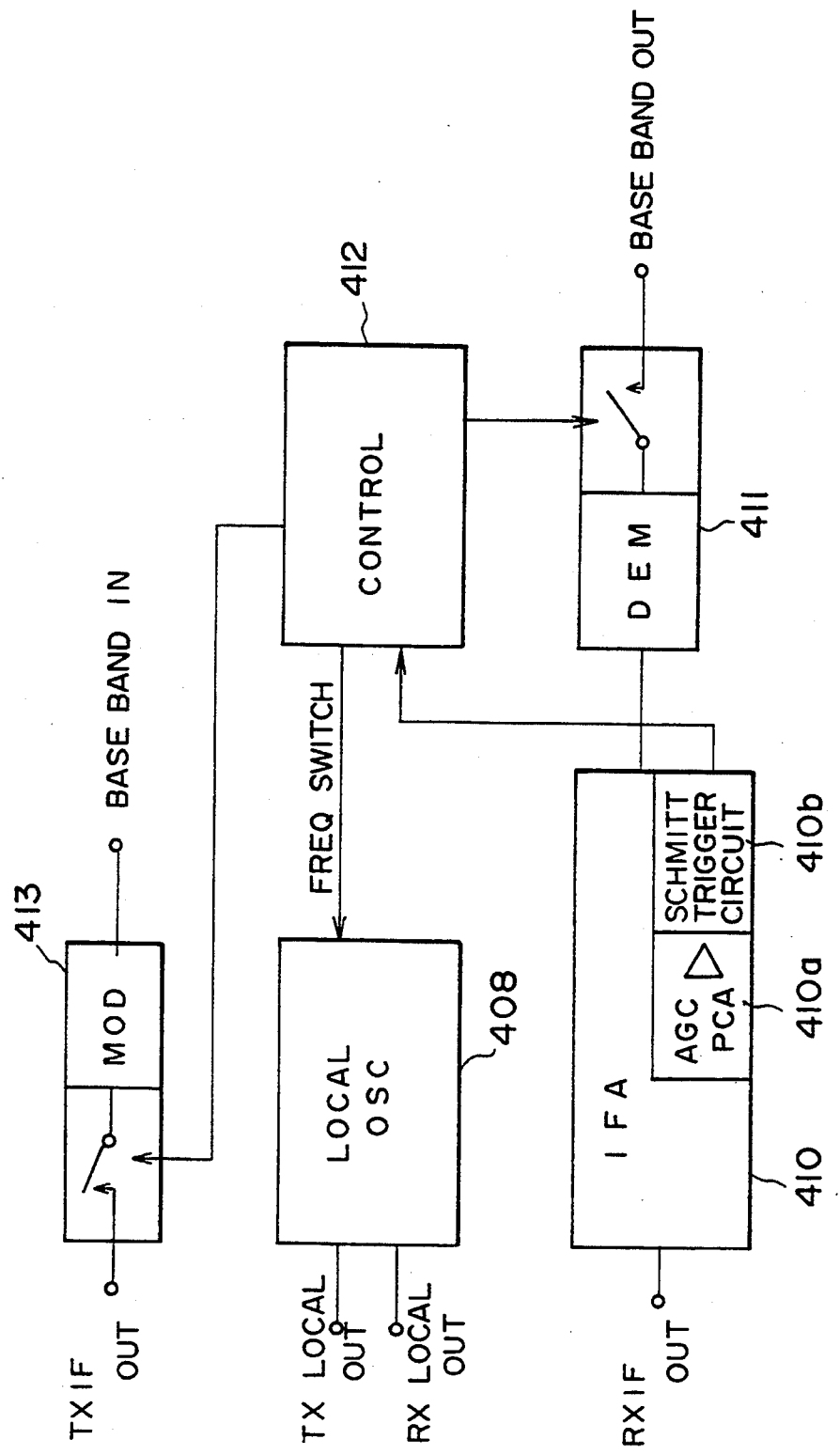
FIG. 7 is a block diagram showing the construction of a part of the mobile terminal of FIG. 6 used for monitoring the intensity of electric field and for switching the frequency based upon the result of monitoring.

Referring to FIG. 7, the IF amplifier 410 includes an AGC circuit 410a for detection of the strength of the electric field of the incoming radio frequency signal in the form of the AGC voltage, and the AGC circuit 410a supplies the output AGC voltage to a Schmitt trigger circuit 410b after amplification in a DC amplifier shown schematically as DCA. The Schmitt trigger circuit 410b thereby produces an output signal upon detection of the AGC voltage crossing a predetermined threshold, and the output signal of the Schmitt trigger circuit 410b is supplied to the controller 412. The controller 412, in turn, controls the local oscillator 408 as well as the modulator 413 and further the demodulator 411 in response to the control signal from the Schmitt trigger circuit 410b and changes the transmission frequency and the receiving frequency of the mobile terminal from $f_A$ and $f_B$ to $f_A'$ and $f_B'$ respectively.

More specifically, when the level of the AGC signal of the incoming RF signal at the frequency $f_A$ has decreased below a predetermined threshold, the controller 412 disables the modulator 413 and the demodulator 411 by turning off the output signal of respective units. Further, the controller controls the local oscillator 408 such that the receiving frequency is switched from $f_A$ to $f_B'$ and such that the transmission frequency is switched from $f_B$ to $f_A'$. As explained previously, such a switching of the frequency occurs when the mobile terminal crosses the border of a zone such as the zone #0 and enters another zone such as the zone #1. The substantially same description applies also to the case when the mobile terminal crosses the border in the reverse direction. As the operation for this case is obvious from the above description, further description thereof will be omitted.

Next, the switching of frequency in the mobile terminal will be described in detail with reference to FIG. 8 showing the flowchart of the switching operation.

Figure 8A:
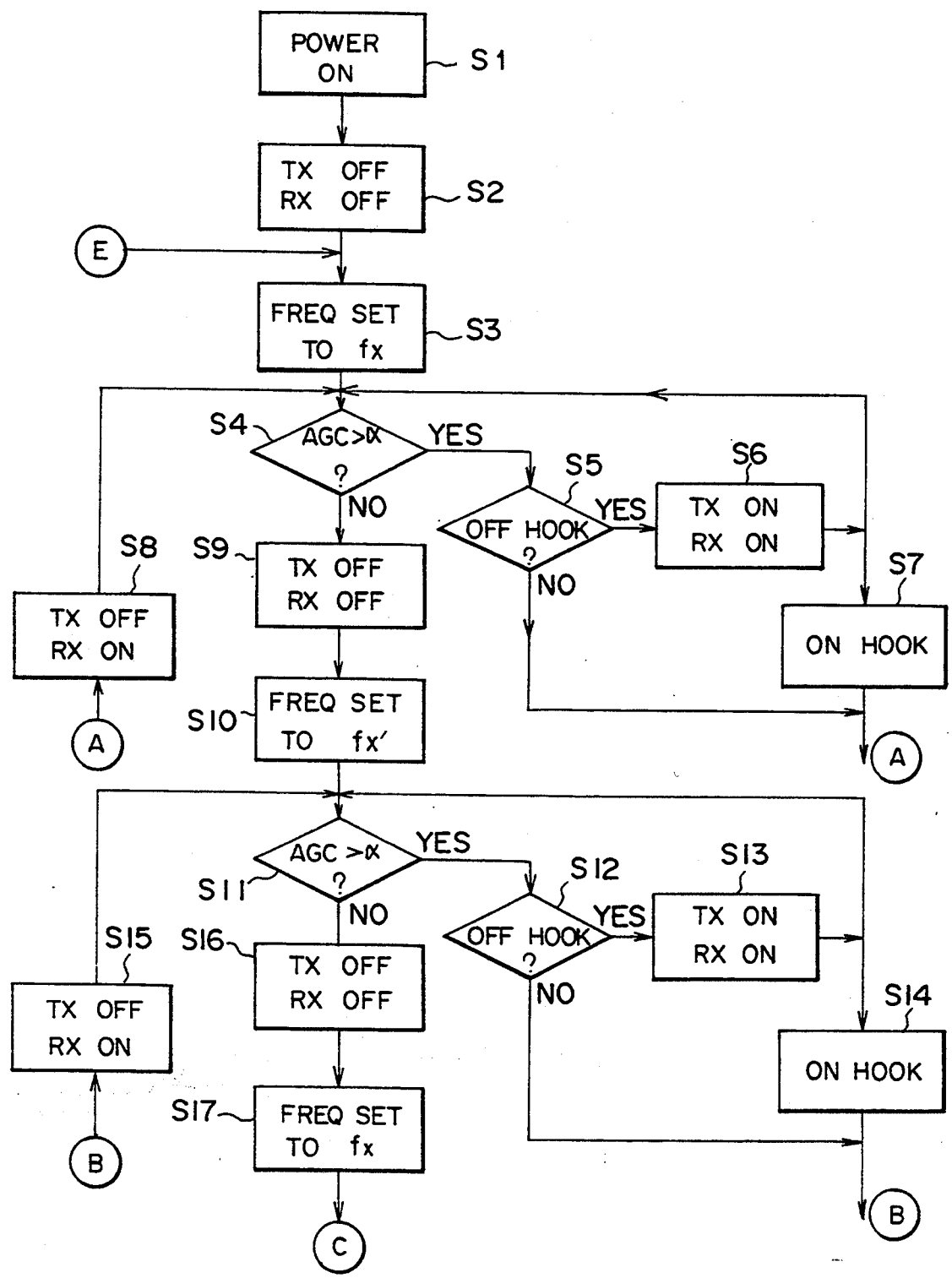
FIGS. 8(A)-8(C) are flowcharts showing the operation of the mobile terminal.

Referring to FIG. 8(A), the mobile unit is activated in the first step S1. In the next step S2, the output of the transmitter system and the receiver system are both turned off and the frequency of the transmitter and the frequency of the receiver are set to a first setting schematically designated as fx in a step S3 that follows the step S2. This first setting fx may include the reception frequency set to $f_A$ and the transmission frequency set to $f_B$.

Next, in the step S4, a determination is made whether the AGC voltage detected by the AGC circuit 410a exceeds a predetermined threshold α or not. If YES, a determination is made further in the following step S5 whether the terminal is in the off-hook state or not. If YES, the outputs of the transmitter system and the receiver system are both activated in the step S6 and the connection is established between the mobile terminal and the public network. Further, while maintaining the connection, the step S4 is carried out to check if the AGC level exceeds the threshold a or not.

When the connection is terminated and the state of the terminal changed to the on-hook state as shown in the step S7, the terminal is set to a stand-by state in the frequency fx in the step S8. In the step S8, the output of the transmitter system is turned off and the output of the receiver system is turned on for detecting a call coming in. The step S8 is conducted also when the result of the determination in the step S5 is NO. Further, the operation of the step S4 and the steps that follow thereto are repeated after the step S8 for monitoring the strength of the electric field of the channel to which the remote terminal is tuned.

When it is determined in the step S4 that the level of the AGC voltage does not exceed the threshold α, the operation jumps from the step S4 to the step S9 for turning off both outputs of the transmitter system and the receiver system similarly to the step S2. Next, the frequency setting is changed in the step S10 from the first setting FX to the second setting FX' that may include the transmission frequency set to $f_A'$ and the reception frequency set to $f_B'$. Further, in the step S11, a determination is made similarly to the step S4 whether the level of the AGC voltage exceeds the threshold α or not.

Thus, when the result of the determination in the step S11 is YES, a step S12 similar to the step S5 is carried out for determining whether the terminal is in the off-hook state or not. If the result is YES, the steps S13 and S14 corresponding to the steps S6 and S7 are carried out similarly, and a step S15 similar to the step S8 is conducted subsequently to set the system in the stand-by state at the frequency fx'. After the step S15, the operation returns to the step S11. In the step S15, the mobile terminal is ready for responding to the call coming in.

Figure 8B:
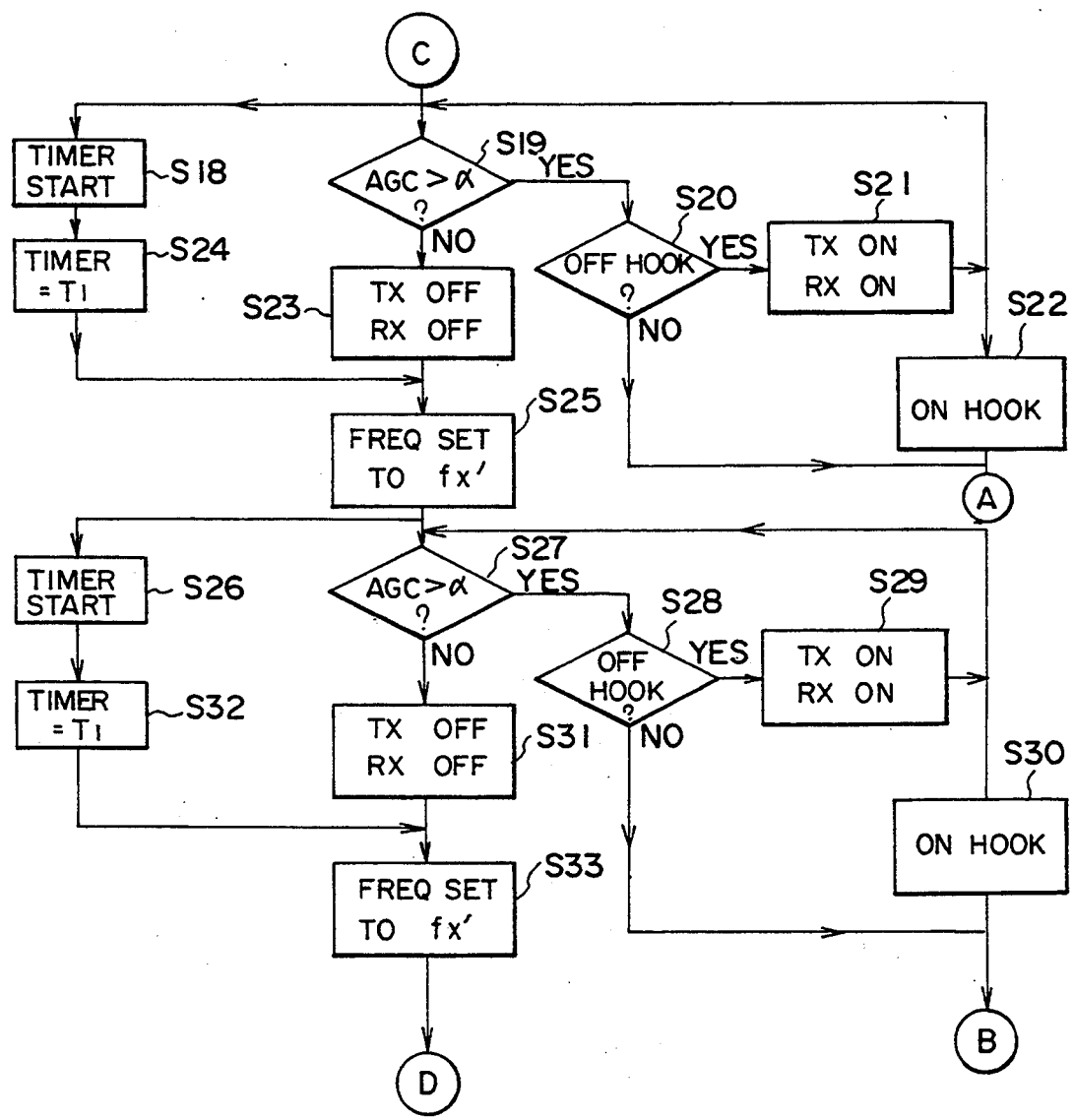

On the other hand, when it is determined in the step S11 that the level of the AGC signal does not exceed the threshold α, a step S16 similar to the step S2 is conducted for turning the output of the transmitter system and the receiver system off, and the frequency setting is switched from FX' to FX. Simultaneously to the step S17 for setting the frequency, a timer is started in the step S18 as shown in FIG. 8(B) and a determination is made in the step S19 whether the level of the gain of the AGC signal exceeds the threshold α or not, similarly to the steps S4 and S11.

When it is determined in the step S19 that the level of the AGC voltage exceeds the threshold the steps S20, S21 and S22 respectively corresponding to the steps S5, S6 and S7 are conducted similarly to the steps following the step S4. Further, when the transition to the on-hook state occurs as shown in the step S22, the step S8 is carried out and the operation returns to the step S4. On the other hand, when the result of the determination of the step S19 is NO the outputs of the transmitter system and the receiver system are both turned off in the step S23 similarly to the step S9. Further, after a predetermined time $t_1$ elapsed as shown in the step S24, the frequency setting of transmission and reception is switched from FX to FX' in the step S25 which corresponds to the step S10. Here, it should be noted that the time $t_1$ relates to the drop time of electric field strength due to the short period fading.

In the state of the step S21 corresponding to the OFF HOOK state, the AGC level is continuously checked by conducting the step S19. When the AGC level does not exceed the predetermined threshold, the step S23 is conducted to turn off the outputs of the transmitter and the receiver without waiting for the timeout of the timer initiated in the step S18, and the step S25 is conducted to switch the frequency from fx to fx'. Further, the AGC level is checked again in the step S27.

Figure 8C:
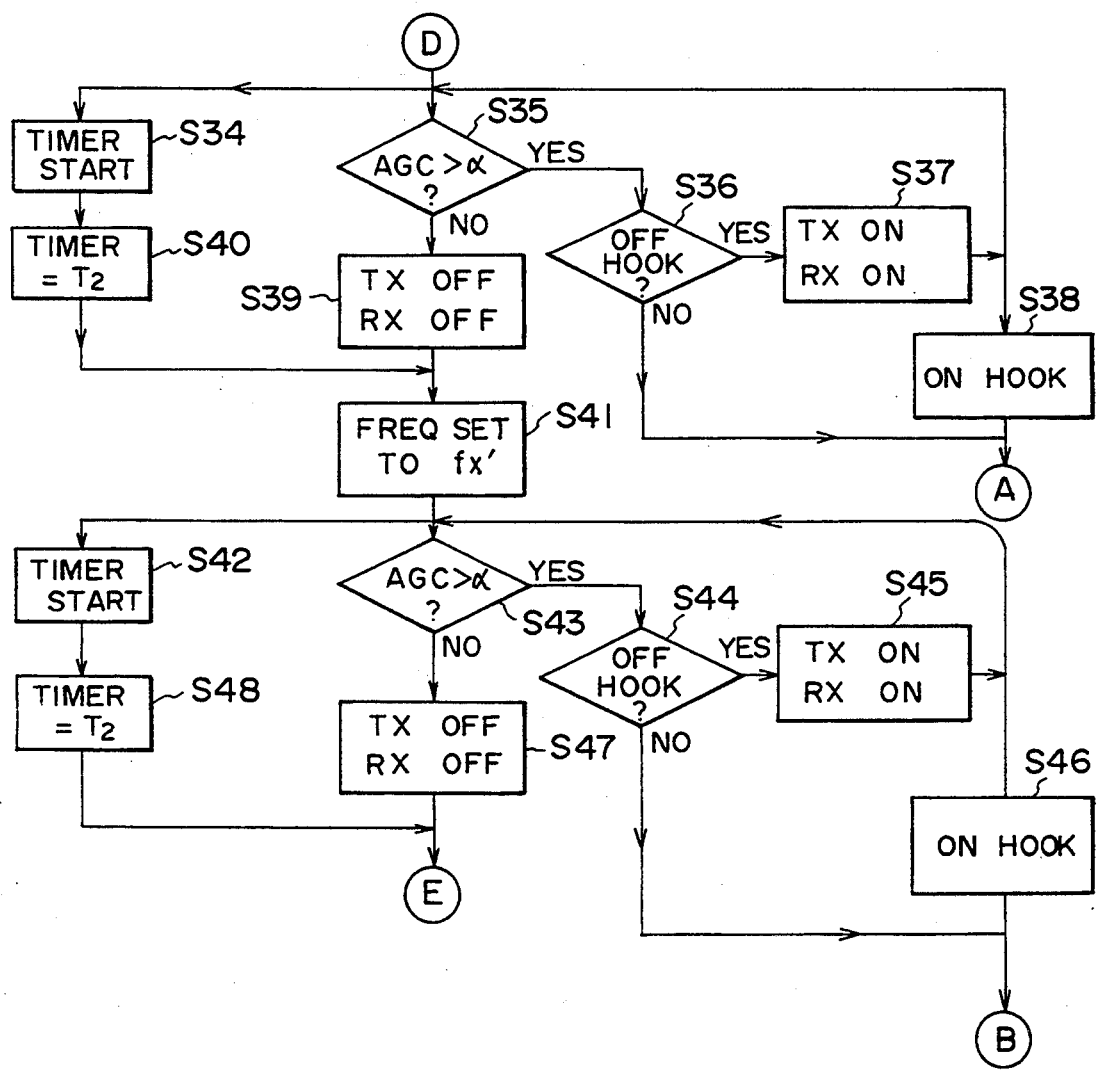

Simultaneously to the setting of the frequency in the step S25, a timer is started in the step S26 and the step S27 is conducted for determining whether the level of the AGC voltage has exceeded the predetermined threshold α or not. If the result is YES, the steps S28, S29 and S30 respectively corresponding to the steps S12 S13 and S14 are achieved, and the operation returns to the step S11 after conducting the step S15. When the result of the determination in the step S27 is NO, the step S31 is conducted for turning off the transmitter system and the receiver system simultaneously, and after the time $t_1$ has elapsed in the step S32, the step S33 is conducted to set the frequency again to the set FX. Further, the steps S34–S48 are conducted as shown in FIG. 8(C), wherein the steps S34–S48 are mere repetition of the steps S18–S33 except that the timer is set to a time $t_2$ that is longer than $t_1$. Here the time $t_2$ relates to the search period for determining whether the mobile terminal has returned to the service zone or not. After the step S47 the operation returns to the step S3 of FIG. 8(A) and the foregoing operation is repeated.

As described heretofore, the remote terminal used in the mobile telecommunication system of the present invention monitors the strength of the electric field of the incoming radio wave used for the channel connection for the proper selection of the station. Thereby, one can simplify the construction of the relay stations $RS_1$–$RS_3$ significantly. The operation shown in FIGS. 8(A)–8(C) is achieved by the controller 412 of the remote terminal. Although the construction of the controller becomes slightly complex such a complexity is within the tolerance in view of the saving of the cost for constructing expensive base stations at a number of locations.

Figure 9:
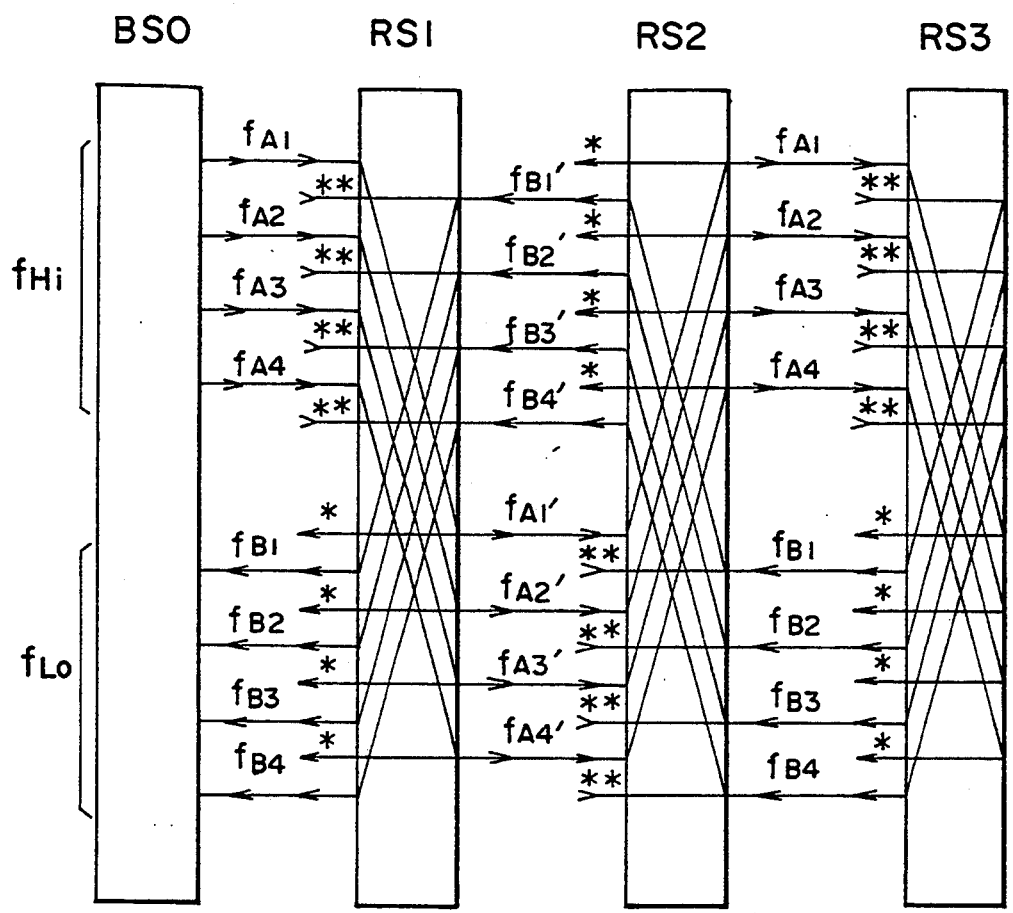
FIG. 9 is a diagram showing the frequency allocation of the mobile telecommunication system of the present invention wherein there are a number of communication channels.

FIG. 9 shows the mobile telecommunication system in operation in the state that there are a number of communication channels. In the illustration, there are four channels in all, i.e. the first channel that uses the frequencies $f_{A1}$, $f_{A1}'$, $f_{B1}$ and $f_{B1}'$; the second channel that uses the frequencies $f_{A2}$, $f_{A2}'$, $f_{B2}$ and $f_{B2}'$; the third channel that uses the frequencies $f_{A3}$, $f_{A3}'$, $f_{B3}$ and $f_{B3}'$; and the fourth channel that uses the frequencies $f_{A4}$, $f_{A4}'$, $f_{B4}$ and $f_{B4}'$. There, the frequencies, $f_{A1}$–$f_{A4}$ and the frequencies $f_{B1}'$–$f_{B4}'$ use the higher frequency band $f_{Hi}$, while the frequencies $f_{B1}$–$f_{B4}$ and the frequencies $f_{A1}'$–$f_{A4}'$ use the lower frequency band $f_{Lo}$. In each band, the relationship on the frequency as shown in FIG. 4 is maintained. For example, the frequency $f_{A4}$ and the frequency $f_{A4}'$ or the frequency $f_{B4}$ and the frequency $f_{B4}'$ are separated from each other by the frequency $\Delta F_s$. Thereby each channel occupies only four frequencies and one can save the precious resource of frequency efficiently.

Further, the present invention is by no means limited to the embodiments described heretofore, but various variations and modifications may be made without departing from the scope of the invention.

What is claimed is:

1. A non-cellular mobile telecommunication system for connecting a public communication network to mobile terminals via radio communication channels, comprising:

a base station connected to said public communication network for receiving information signals therefrom and having a non-directional antenna for broadcasting said information signals at a first frequency over a first operational zone, said first operational zone being characterized by an electric field strength of said broadcast from said base station that exceeds a predetermined level, said base station further receiving radio transmissions at a second, different frequency by said non-directional antenna and transferring information signals contained therein to said public telecommunication network;

a relay station provided outside said first operational zone and having a directional antenna directed to said non-directional antenna of said base station for receiving said broadcast therefrom, said relay station further having a non-directional antenna for broadcasting said information signals contained in said broadcast from said base station, at a third frequency which is different from any of said first and second frequencies over a second operational zone, said second operational zone being characterized by an electric field strength of said broadcast from said relay station that exceeds a predetermined level, said relay station further receiving radio transmissions at a fourth frequency different from any of said first through third frequencies by said non-directional antenna provided thereto and transmitting information signals contained thereto from said directional antenna of said relay station to said non-directional antenna of said base station; and a mobile terminal movable between said first and second operational zones and operating in either of said first and second operational zones, said mobile terminal receiving said broadcast from either said base station at said first frequency or said relay station at said third frequency and transmitting information signals to either the base station at the second frequency or the relay station at the fourth frequency, said mobile terminal monitoring the strength of said electric field of said broadcast from said base station and said relay station for selecting a reception at said first frequency and a transmission at said second frequency when said monitored strength of the electric field of the broadcast from the base station exceeds a predetermined threshold, said mobile terminal further selecting a reception at said third frequency and a transmission at said fourth frequency when said strength of the electric field of the broadcast from the base station does not exceed said predetermined threshold wherein said mobile terminal selects reception frequencies independently without control from said base, said relay or other stations.

2. A mobile telecommunication system as claimed in claim 1, in which said system further comprises another, second relay station provided outside said first and second operational zones and having a directional antenna directed to said non-directional antenna of said first relay station for receiving said broadcast therefrom with said third frequency, said second relay station further having a non-directional antenna for broadcasting said information signals contained in said broadcast from said first relay station over a third operational zone with said first frequency, said third operational zone being characterized by an electric field strength of said broadcast from said second relay station that exceeds a predetermined level, said second relay station further receiving radio transmissions at said second frequency by said non-directional antenna provided thereto and transmitting information signals contained therein to said non-directional antenna of said second relay station from said directional antenna of said second relay station with said fourth frequency.

3. A mobile telecommunication system as claimed in claimed 1, in which said relay station comprises a first receiver for receiving said broadcast from said base station at the first frequency for producing a baseband signal in response thereto, a first transmitter supplied with said baseband signal from said first receiver for producing a radio frequency signal with said third frequency, a second receiver for receiving said transmission at said fourth frequency for producing a baseband signal, and a second transmitter supplied with said baseband signal from said second receiver for transmitting said baseband signal as a radio frequency signal with said second frequency.

4. A mobile telecommunication system as claimed in claim 3, in which said first and second receivers and said first and second transmitters are provided in number corresponding to the number of talk channels used in the mobile telecommunication system.

5. A mobile telecommunication system as claimed in claim 1, in which said mobile terminal comprises: a receiver system connected to an antenna for receiving received radio frequency signals therefrom, said receiver system being capable of receiving either of said first frequency and said third frequency and producing a baseband signal in response to said received radio frequency signals; a transmitter system supplied with said baseband signal for producing a radio frequency signal, said transmitter system being connected to said antenna of said mobile terminal and producing said radio frequency signal at either of said second and fourth frequencies and supplying said radio frequency signal further to said antenna for radiation; and a controller for controlling frequency reception of said receiver,system and said transmitter system; said receiver system including: an automatic gain control unit that produces an AGC voltage in response to the strength of the electric field associated With the radio frequency signal to which the receiver system is tuned; and a threshold circuit supplied with said AGC voltage for determining whether said AGC voltage has exceeded said predetermined threshold or not and for producing an output signal indicative of the result of said determination; wherein said controller is supplied with said output signal from said threshold circuit for switching said frequency of said receiver system and said frequency of said transmitter system between a first set in which said receiver system is tuned to said first frequency and said transmitter system is tuned to said second frequency, and a second set in which said receiver system is tuned to said third frequency and said transmitter system is tuned to said fourth frequency.

6. A mobile telecommunication system as claimed in claim 5, in which said receiver system comprises a receive mixing circuit supplied with said radio frequency signal received at said antenna for producing an intermediate frequency signal as a result of mixing with a receive local oscillation signal, an intermediate frequency amplifier for amplifying said intermediate frequency signal, and demodulation means for demodulating said intermediate frequency signal to produce said baseband signal; said transmitter system comprises a modulation circuit supplied with said baseband signal for producing a modulated intermediate frequency signal; and a transmit mixing circuit supplied with said modulated intermediate frequency signal and further with a transmit local oscillation signal for producing a radio frequency signal to be supplied to said antenna; wherein said mobile terminal further comprises a local oscillator for producing said receive and transmit local oscillation signals under control of said controller, said controller changing said receive and transmit local oscillation signals in response to the output signal of said threshold circuit.

7. A mobile telecommunication system as claimed in claim 6, in which said mobile terminal includes: a first band-pass filter having a passband for said first and fourth frequencies; a second band-pass filter having a passband for said second and third frequencies; first switching means provided for connecting said first and second band-pass filters for connecting said first and second band-pass filters to said receive and transmit mixing circuits such that an output radio frequency signal of said transmit mixing circuit is supplied to one of said first and second band-pass filters and such that an output radio frequency signal of the other of said first and second band-pass filters is supplied to said receive mixing circuit; an RF power amplifier supplied with said output frequency signal for amplifying the same radio frequency signal to produce a large power radio frequency signal; a low-noise RF amplifier supplied with said received radio frequency signal for amplifying the same with a high signal-to-noise ratio; second switching means connecting said RF power amplifier and said low-noise RF amplifier to said first said second band-pass filters such that a radio frequency signal produced by said transmit mixing circuit and passed through said one of said first and second band-pass filters is supplied to said RF power amplifier as an input radio frequency signal and such that a radio frequency signal received by said antenna and amplified by said low-noise RF amplifier is supplied to said receive mixing circuit via the other of said first and second band-pass filters.

* * * * *

UNITED STATES PATENT AND TRADEMARK OFFICE
CERTIFICATE OF CORRECTION

PATENT NO. : 5,408,679  
DATED : April 18, 1995  
INVENTOR(S) : Masuda

Page 1 of 2

It is certified that error appears in the above-indentified patent and that said Letters Patent is hereby corrected as shown below:

On the title page, item [54],

Title, delete "Telecommunications" and insert --Telecommunication--.

Column 1, line 2, delete "Telecommunications" and insert --Telecommunication--.

Column 1, line 20, delete "channels" and insert --channel--.

Column 1, line 43, delete "System" and insert --system--.

Column 1, line 49, delete "or, relay" and insert --or relay-.

Column 2, line 49, delete "10".

Column 2, line 51, delete "Switching" and insert --switching--.

Column 3, line 57, delete "Conventional" and insert --conventional--.

UNITED STATES PATENT AND TRADEMARK OFFICE
CERTIFICATE OF CORRECTION

PATENT NO. : 5,408,679
DATED : April 18, 1995
INVENTOR(S) : Masuda

It is certified that error appears in the above-indentified patent and that said Letters Patent is hereby corrected as shown below:

Column 7, line 19, delete "Such" and insert --such--.

Column 8, line 20, delete "a".

Column 8, line 28, delete "off" and insert --of--.

Column 11, line 16, delete "a or" and insert -- or --.

Column 11, line 63, after "threshold" insert --$\alpha$,--.

Column 14, line 59, delete "With" and insert --with--.

Signed and Sealed this

Fourteenth Day of November, 1995

*Attest:*

BRUCE LEHMAN

*Attesting Officer*  *Commissioner of Patents and Trademarks*